United States Patent [19]

Bennett

[11] Patent Number: 4,503,101
[45] Date of Patent: Mar. 5, 1985

[54] FOLDABLE, POP-OPEN CORNER REFLECTOR DECOY TARGET ARTICLES

[75] Inventor: John G. Bennett, Macomb, Mich.

[73] Assignee: The United States of America as represented by the Secretary of the Army, Washington, D.C.

[21] Appl. No.: 529,440

[22] Filed: Sep. 6, 1983

[51] Int. Cl.³ .................. A47G 33/08; G09F 19/00
[52] U.S. Cl. .................. 428/9; 40/124.1; 273/348; 428/12; 428/542.2; 446/148
[58] Field of Search ............ 40/539, 124.1; 46/1 R; 428/9, 11, 12, 542.2; 446/148; 273/348

[56] References Cited

U.S. PATENT DOCUMENTS

| | | | |
|---|---|---|---|
| 927,499 | 7/1909 | Davis | 428/9 X |
| 1,472,520 | 10/1923 | Grimm | 428/9 |
| 1,635,915 | 7/1927 | White | 428/12 X |
| 2,688,820 | 9/1954 | Shemet | 428/11 X |
| 3,728,201 | 4/1973 | Stroehmer | 428/9 |
| 4,120,100 | 10/1978 | Dugan | 428/11 X |

Primary Examiner—Henry F. Epstein
Attorney, Agent, or Firm—Peter A. Taucher; John E. Becker; Robert P. Gibson

[57] ABSTRACT

A novel foldable and essentially self-opening, light weight, multi-panel device which preferably is primarily useful as a collapsible, expendable or retrievable and reusable reflector type military decoy target, capable of reflecting microwaves, millimeter waves and light waves. Its ability to be folded relatively flat minimizes storage space requirements, thus allowing for many more units to be carried by troops in the field. With a spring-loaded "pop-open" character and capability of being constructed in several different forms or shapes, it has a unique essentially self-opening, self-orienting ability which facilitates a quick, easy and nearly automatic deployment. Functioning as a corner type reflector decoy, it reflects much more of the source-generated energy waves back to the source than would a normal size non-reflective article, irrespective of its deployed orientation relative to the source thereby deceiving the enemy into thinking that there is a large object such as a tank in that area. Certain variations can individually provide respectively for desired complete area coverages, while a relatively few of still other variations can achieve the same desired full area coverage responsive to a random dispersal thereof.

Additional contemplated uses hereof include various navigational aides, and alternatively for unrelated aesthetic decorations, and multi-faced advertising and recreational/toy devices. With various overall envelope configurations of substantially cubical, spherical and various polyhedron shapes, these articles are potentially conducive to playful toy use as by tossing, throwing and/or kicking thereof in ball-like form.

5 Claims, 17 Drawing Figures

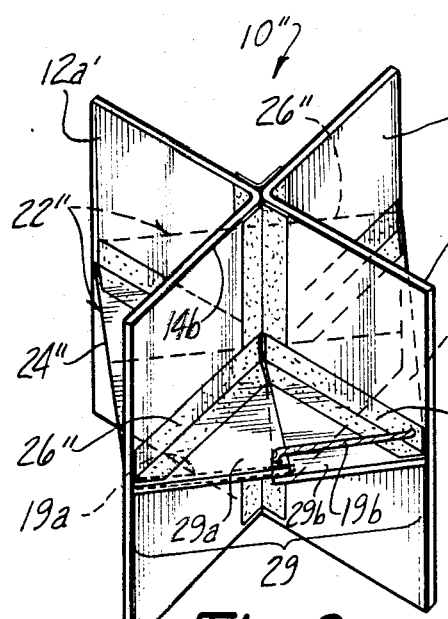
Fig-8
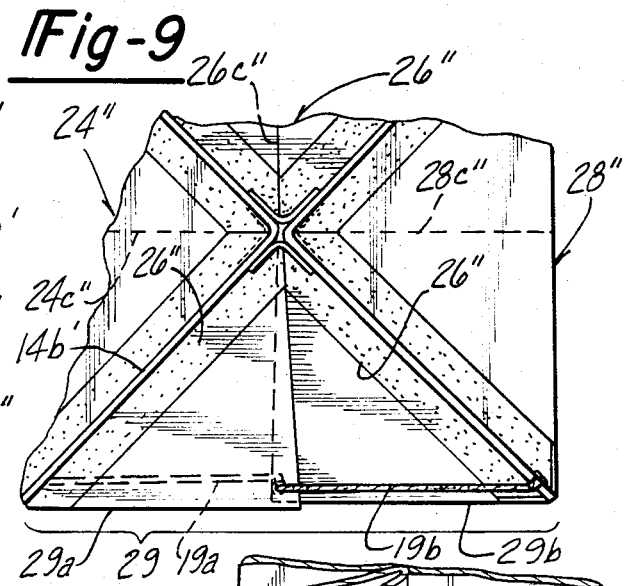
Fig-9
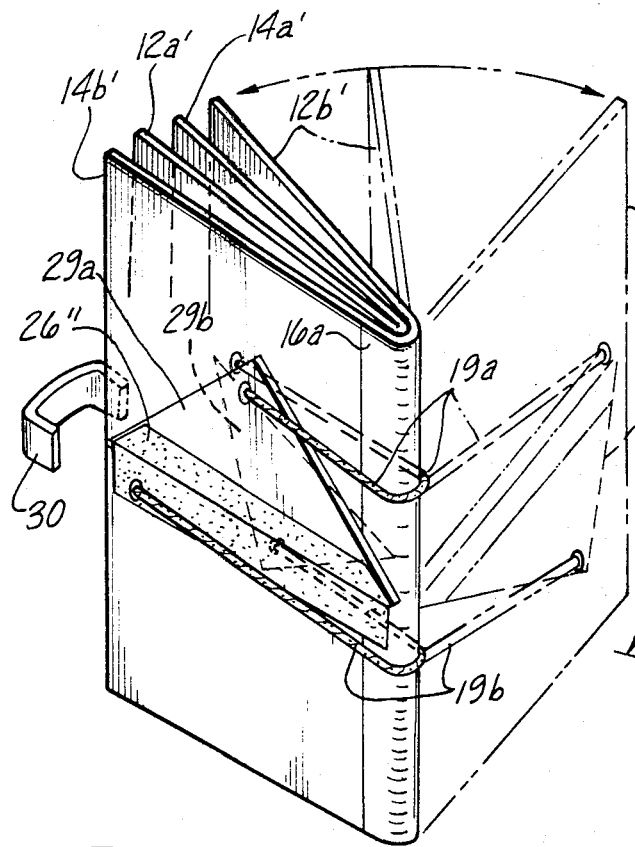
Fig-10
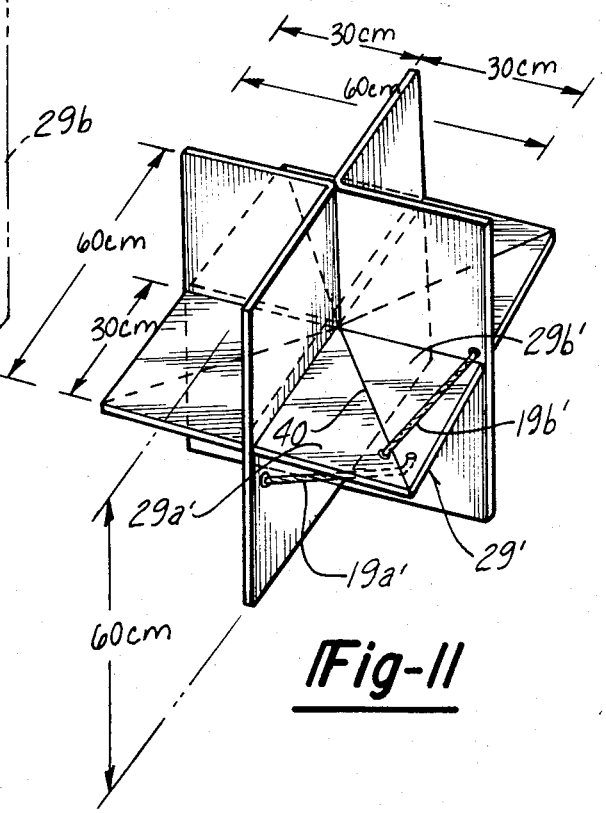
Fig-17
Fig-11

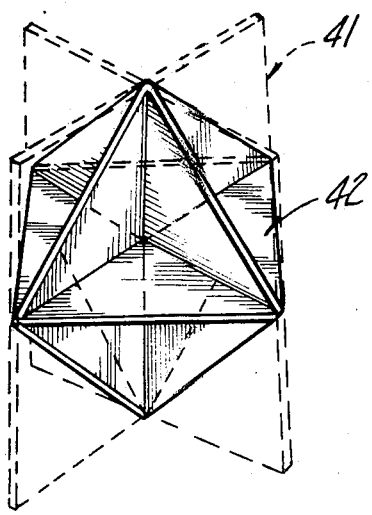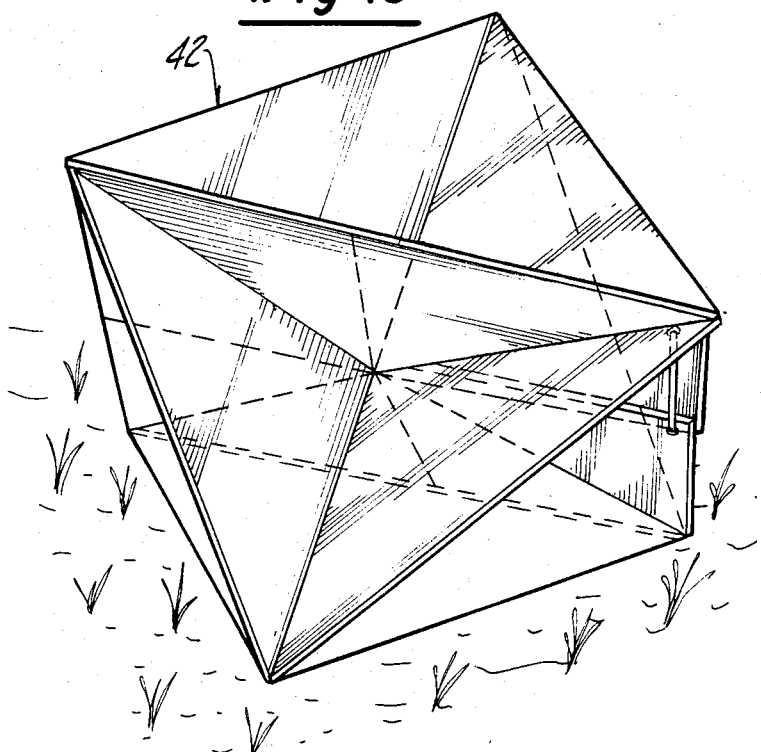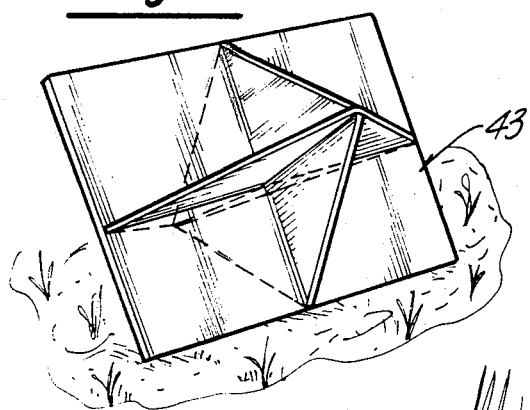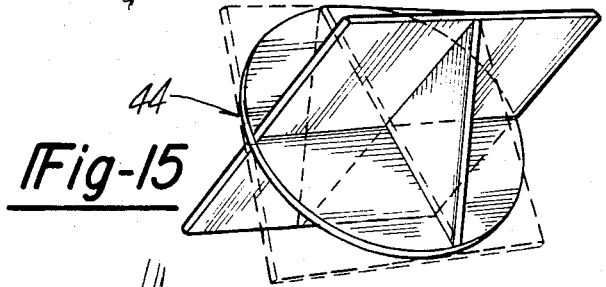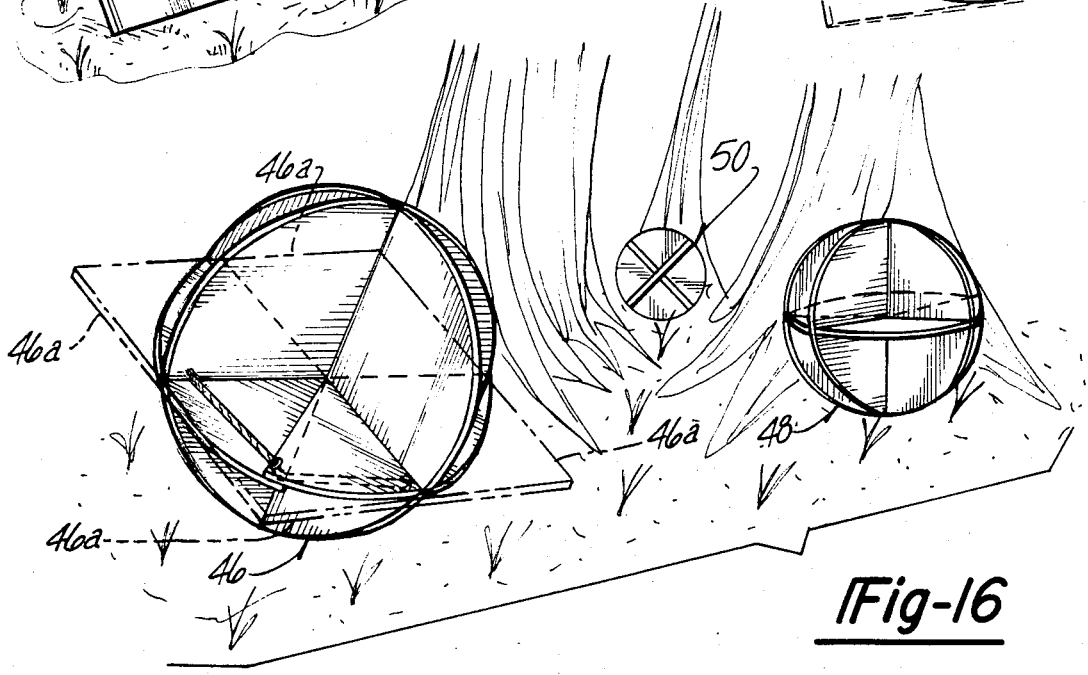

FOLDABLE, POP-OPEN CORNER REFLECTOR DECOY TARGET ARTICLES

GOVERNMENT INTEREST

The invention described herein may be manufactured, used, and licensed by or for the Government for governmental purposes without payment to me of any royalty thereon.

BACKGROUND OF THE INVENTION

The present invention relates more generally to corner reflector articles and more specifically to units which are foldable in character and embody novel pop-open features. The articles herein are made so that their panel members can be folded adjacent one another into relatively flat booklike units for compact storage, and are such that upon release and deployment, each unit automatically pops-open to form a plurality of from preferably 6 to 8 right angle trihedral corner reflectors integrated therewith.

These novel articles are potentially useful for various and unrelated purposes, including use as a reflector of microwaves, millimeter waves, and lightwaves. One very important military use would be as a decoy target. Used as such, they reflect much more of the source-generated energy waves back to the source than would normal size non-reflective articles, irrespective of their deployed orientation relative to the source, thereby deceiving the enemy into thinking that there are one or more large objects such as a tank or a truck in that area. The ability to fold generally flat minimizes storage space requirements, thus allowing for many more units to be carried by troops in the field.

The articles also can be used as navigational aides for shipboard use to make them visible to radar on other vessels, for hastily constructed airports, helicopter landing sites, and for rescue sites.

Other non-analogous uses envisioned for these foldable articles include scaled down low cost highly aesthethic decorations, multi-faced advertising devices in various sizes, and various recreational or toy-like devices. For all uses of these articles, they may embody different geometric overall envelope configurations including those having substantially cubical, spherical and various polyhedron shapes, and combinations thereof.

OBJECTIVES AND SUMMARY OF THE INVENTION

It is among the principal objects of the present invention to provide a variety of novel readily foldable articles having a unique pop-open feature, and adaptable for a variety of different applications and in a variety of different forms or embodiments.

A further object is to provide a new and improved collapsible type pop-open corner reflector or other article using certain interconnected hinged panel members for providing the basic orthogonal relatively firm relationship of the first two panel means, while still providing in certain selective embodiments when deployed at least a partial third orthogonally related panel means which is also collapsibly compatible with the overall desired fold-up characteristics thereof.

A more specific object is to provide a unique, reflective-material-coated, collapsible corner reflector military decoy target article available in several different forms and shapes, all having the unique pop-open character to facilitate quick and easy deployment thereof; and many of which are essentially self-orienting as well as nearly self-deployable by way of the 'pop-open' feature.

Residual objectives include the provision of such foldable but pop-open relatively light weight articles which may be used for non-military applications such as multi-faced advertising devices, colorful decorations, and various recreational/toy devices.

The foregoing and other objectives are achieved briefly as follows. In a basic form, four relatively rigid, hinged reflective plates or panel members are joined together along one edge so that they constitute half-panel members which, in turn, when deployed in use form two basic composite orthogonally related reflective panel means, and of which all half-panel members are free to move in a hinged fashion not unlike the leaves or pages of a book. Then in one preferred embodiment, three preferably generally right triangular reflective plates or panels also of relatively rigid character are separately attached by suitable hinge means to the medial portions respectively between adjacent ones of three of the aforesaid first-mentioned four reflective half panel members, and are also adapted to assume an orthogonal relationship to the other two basic orthogonally disposed panel means.

Each of the said three generally triangular reflective plates or panels is made-up of two smaller generally triangularly shaped sub-panel members joined together also in hinge-like bi-folding fashion along a line which is medially bisecting of the aforesaid half-panel members. A spring means is operatively attached to and disposed generally between the remaining or fourth pair of adjacently connected half-panel members, and in a manner which provides a requisite pop-open impetus to establish the overall orthogonal relationships and functional mode of the corner reflector decoy article.

A removable clip is used to hold the hingedly connected panel members in their folded-up book-like condition against the bias of the spring means until ready for deployment.

For another modification, in lieu of the three generally right triangular relatively rigid reflective panels being hingedly and bi-foldingly interposed between said adjacent ones of the first-mentioned four reflective half-panel members, alternative mode flexible means are usable for helping establish the deployed orthogonal relationships of the various panel means. The flexible means for one embodiment may be simply predetermined lengths of flexible cord or string connected to respectively medial portions preferably near the outermost radial edges of adjacent ones of the aforementioned respective adjacent panel members, so as to effect the relatively orthogonal quadrant, relationships when in useful deployment. In a different embodiment the flexible means may have the form of flexible sheet material having a metallized reflective coating on both surfaces thereof, which sheet material is of generally right triangular form to orthogonally establish similar quadrant areas when in the deployed in-use condition.

The foregoing objectives and summary will become further apparent from the following more detailed description taken in conjunction with the illustrative drawing figures.

DESCRIPTION OF DRAWING FIGURES

FIGS. 1 and 2 respectively are a perspective view from above of one form of the present article invention, and a top plan view thereof, both being in the unfolded, deployed open condition;

FIG. 6 is a fragmentary top plan view of a modification of a spring means feature for providing a 'pop-open' function during deployment of the article;

FIGS. 7 and 8 are perspective views of two of the various modifications for this article;

FIG. 9 is a fragmentary top plan view of the modified article shown in FIG. 8, shown on a slightly enlarged scale;

FIG. 10 is a perspective view of the modified article depicted in FIGS. 8 and 9, but showing it in its essentially folded-up condition;

FIGS. 11 and 12 are perspective views generally similar to FIG. 8 but showing still other variations of the overall shape of a reflector decoy or other article;

FIG. 13 is an enlarged perspective view of the reflector decoy article of FIG. 12, but showing it in a differently oriented exemplary deployed position;

FIGS. 14, 15, and 16 are perspective views representative of still further modified embodiments of the article hereof; and of which FIG. 16 exemplifies a random field dispersal of one of the modified embodiments; and FIG. 17 is a fragmentary perspective view showing further modification details of construction.

DETAILED DESCRIPTION OF THE PREFERRED EMBODIMENTS

FIGS. 1-5 illustrate a pop-open type of multiple corner article assembly 10 which is but one of several preferred embodiments constructed in accordance with the present invention. Assembly 10 is more preferably contemplated for use as a multiple corner reflector article adaptable for use as a military decoy target by its ability to reflect various millimeter waves, microwaves and lightwaves, all previously described hereinabove.

In this first basic form, the assembly 10 comprises two basic intersecting composite panel means 12 and 14, which when in use are adapted to be orthogonally related. Thus, four relatively rigid rectangular reflective type plates or half-panel members 12a, 12b and 14a, 14b are hingedly interconnected along one edge by suitable hinge means 16 so that they constitute the aforesaid panel means 12 and 14 respectively. All of the half-panel members 12a, 12b, 14a, 14b are free to generally pivotally move around the axis of the hinge means 16, somewhat like pages in a book.

The plates or panel members used in making this article should be made of durable weatherproof material such as lightweight sheet metal or heavy cardboard or other relatively rigid panel board. The panels then are suitably finished or covered with a reflective foil sheet material, or they may be spray coated with a metallic reflective paint, so that the assembled units are capable of effectively reflecting the various types of target seeking microwaves, millimeter waves, and light waves. The panels may comprise suitably finished sheets of aluminum, aluminum alloy, chrome plated steel, or stainless steel, among other materials.

Figure 1:
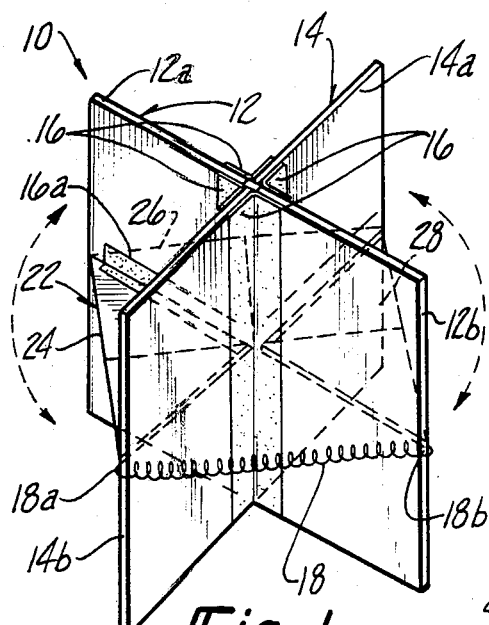
Figure 2:
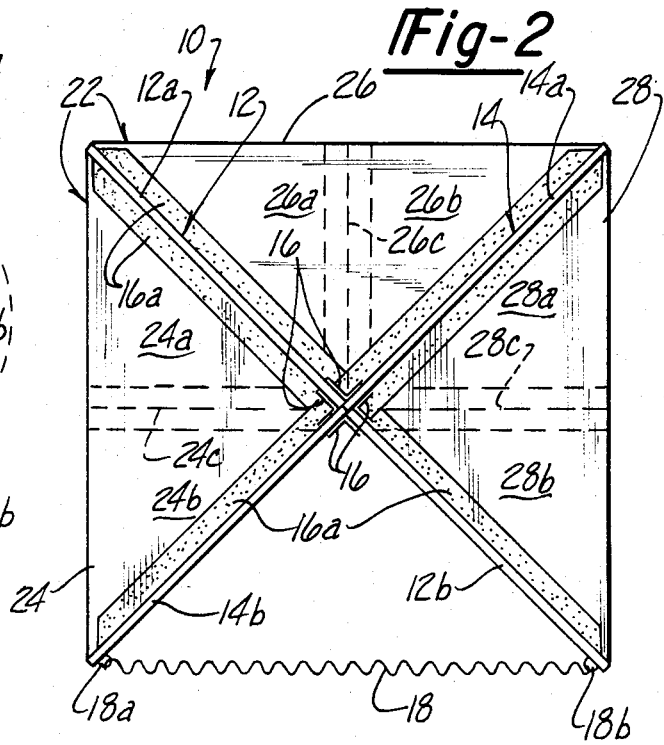
Figure 3:
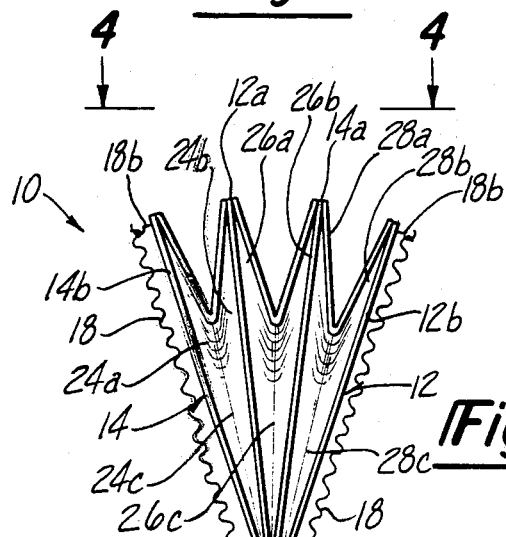
FIG. 3 is a top plan view of the article of FIGS. 1 and 2 in a partially folded condition.
Figure 5:
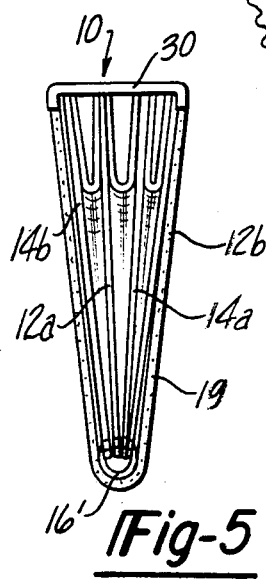
FIG. 5 is a further top plan view of the article of FIGS. 1-4, showing the article in its fully folded condition.

In FIGS. 1 and 2, the hinge means 16 are shown in the form of flexible tapes preferably adhesively applied, whereas in FIGS. 3 and 5, the hinge means 16' are shown in an alternative form of a plurality of separable rings or spiral-like binder coil member.

The most basic form of reflector article may embody only the two panel means 12 and 14, which panels when deployed in functional use assume as orthogonally crossed relationship under the impetus of an appropriate spring means, such as a compression type coil spring 18.

The coil spring 18 has its ends operatively connected preferably at generally opposed outermost medial areas 18a and 18b respectively of the half panel members 12b and 14b. A suitable compression type spring should have an appropriate initial or pre-loaded degree of compression to achieve the desired snap open or 'pop-open' action of the folded article.

To assure that the two basic panel means 12 and 14 assume the desired at least approximately 90° quadrant relationship under the impetus of spring 18, in the case of a very simple or basic form of reflector assembly, self-limiting strings or cords 20 or predetermined length, such as illustrated in the FIG. 17 detail, may be connectively used between the half panel members forming each of the other three quadrants other than that across which spring 18 is connected. It is apparent that this most basic unit will provide only four dihedral corner reflectors. Units of this type should be randomly deployed in a variety of different orientations to provide some minimally acceptable measure of desired coverage.

Most of the corner reflector embodiments will preferably embody a further, third composite panel means designated generally by the reference number 22 in FIGS. 1 and 2. This third panel means 22 is comprised of at least one and preferably more than one such quarter panel member. These panel members are foldable in character and adapted to span quadrant areas formed between and to be also orthogonally oriented relative to the first two orthogonal panel means 12 and 14, when all are in their deployed ready-to-use condition.

In FIGS. 1-5, third panel means 22 comprises three relatively rigid or semi-rigid right triangular reflective type quarter panel members designated 24, 26, and 28 respectively. Each of these members is foldably connected by suitable means such as tape or fabric hinges 16a to the general mid-portions of the respective rectangular half-panel members which collectively help define those in-use quadrant areas which are not directly traversed or bridged by the coil spring 18.

Figure 4:
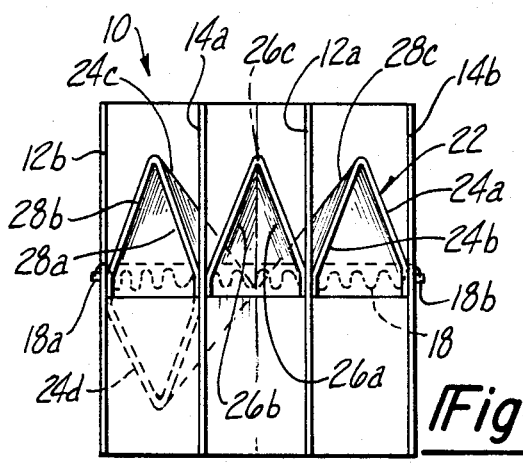
FIG. 4 is an elevational view taken on line 4—4 of FIG. 3, showing the article of FIGS. 1-3 also in a partially folded condition.

Each of the said three triangular shaped quarter panel members 24, 26, and 28 are of isosceles triangular shape, which, in turn, are comprised of two smaller isosceles right triangular subsection panel members 24a, 24b; 26a, 26b; and 28a, 28b, respectively. These various subsections constitute bisectional approximate one-eight panel members which are medially foldable along fold lines 24c, 26c, and 28c, respectively. The respective bisectional one-eight panel members are interconnected along the aforesaid fold lines either by integral material folds and/or by supplemental tape hinge material, so as to be freely foldable in either the up or down direction. In FIGS. 3 and 4, these bi-folding quarter panel members are shown in solid lines as folded in the up condition, whereas in FIG. 4 one of bi-foldable panel member 24 is shown in phantom or dotted lines at 24d in a folded-down alternative position. During the actual folding of the unit into its closed condition, it is understood that some of the composite triangular quarter panel members may fold upwardly while others may fold downwardly.

Thus, with suitable third panel means 22 unitarily embodied in the reflector article assembly 10, as per FIGS. 1–5, it becomes evident that when in its unfolded deployed condition, it forms six trihedral reflectors and one dihidral corner reflector. This arrangement consequently offers the advantage of high reflectance over a much wider range of angles of incidence, than the two panel form.

FIG. 5 shows the reflector assembly 10 in its fully folded pre-deployment storage condition. In this condition, a suitable removable clip means 30 is used to retain it in the generally flat folded condition. In this FIG. 5 assembly, the coil spring 18 has been replaced by a heavy duty elastic type cord 19 which may constitute a more preferred form of spring means.

Figures 6, 7:
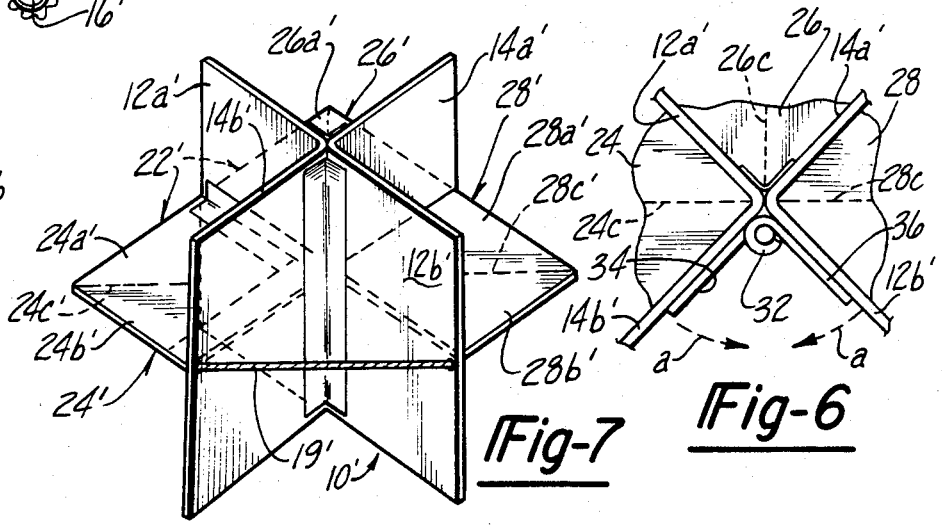

FIG. 6 is a fragmentary detail view showing a contemplated different type of spring means, such as a coiled expansion spring 32. Spring 32 has opposite end spring arms 34,36 extending from the spring coil body. Spring 32 is appropriately attached along one side of the center folds of the panels, with spring arms 34 and 36 being preferably attached to half panel members 12b' and 14b'. The spring 32 may be of a type generally like those used in a conventional type of mousetrap, which spring acts in the direction of dotted arrows a,a to draw said half panel members 12b' and 14b' toward one another, until limited by the bifolding triangular panels 24, 26, and 28, all of appropriate predetermined size.

FIG. 7 illustrates a further embodiment wherein reflector assembly 10' generally comprises the same combination of orthogonally arrangable panel means, as described relative to FIGS. 1–5. Primed reference characters help correlate and identify parts corresponding at least partially to the first used unprimed reference characters, more particularly relative to FIGS. 4, 5, and 6. The primary difference in the FIG. 7 form is the overall rectangular or square shape of the respective quarter panels members 24', 26' and 28' compared to the triangular shapes depicted in FIGS. 1–4. Elastic cord 19' is used therewith to provide the requisite 'pop-open' impetus. This form provides the same number and types of corners as described relative to the previously described embodiment.

Proceeding to a still further modified and perhaps at times more preferred embodiment, reference is made to the form in the illustrative drawing FIGS. 8–10. This embodiment also is very much like that of FIGS. 1–5, except that this assembly 10" provides for a full 360° complete composite third panel means 22". In this latter regard, in addition to the three triangular shaped quarter panel members 24", 26", and 28", corresponding respectively to 24, 26 and 28 described relative to FIGS. 1–5, it includes a fourth composite triangular quarter panel assembly of foldable but split-apart character, designated 29. Overall triangular panel assembly 29 includes two smaller generally triangular bisectional sub-panel members 29a and 29b which are respectively approximately one-eighth panels which are hingedly connected along only one of their edges, as by tape hinges 26". For each of these two bisectional sub-panel members 29a and 29b, there is a spring means 19a and 19b which connects the outermost corner portion of each sub-panel member to the opposite rectangular plate 12b' and 14b', as shown, These spring means, which may be of either the coil spring or elastic cord type, are under tension and serve to pull and hold the reflector assembly in its open condition. The elastic cord type spring means are preferably made of silicone rubber cord material to preclude or minimize losing their resilience in extra cold weather conditions.

FIG. 10 shows it in the nearly closed book-like condition, whereupon the retaining clip 30 would be applied to hold it in the storage condition.

FIG. 11 is a perspective view of another modified embodiment, representing a modification to the form shown in FIG. 7. In addition to the form of FIG. 7, this form includes a rectangular shaped type of the same general composite fourth quarter panel assembly 29', corresponding to assembly 29 in FIGS. 8–10. While for the form of FIGS. 8–10, the two bisectional sub-panel member 29a and 29b are shown as slightly overlapping one another when in the deployed condition, in FIG. 11, the corresponding sub-panel members 29a' and 29b' may be more accurately one-eighth panel size so as to essentially abut one another along the hypotenuse line 40, under the impetus of elastic cord members 19a' and 19b' respectively.

By this further inclusion of such a fourth triangular quarter panel assembly, it is apparent that this assembly pops open for use to form eight trihedral corner reflectors, compared to the six trihedral corners for the embodiments of FIGS. 1 and 7. Thus, this form may provide even a higher degree of reflectance over a wider range of angles of incidence, thus requiring fewer units to provide desired coverages for given areas.

While for some applications it may be preferable to have all four composite panel members to form the said eight trihedral corner reflectors, it is to be understood that if the fourth one is not embodied therewith, i.e., by leaving the one dihedral arrangement as described in the form of FIGS. 1 and 7, it will provide a wave return by reflecting from two surfaces instead of three. The advantage thereof is that the returning wave would be of different character or polarization. For example, where an even number of corner reflectors are used to provide an even number of wave bounces, it will provide the same polarization, whereas use of an odd number of reflectors will provide an opposite polarization. Sophisticated missile seekers can determine the difference between a vehicle and mere background reflections by comparing the relative amounts of opposition and the same or like polarizations; thus by having both dihedral and trihedral reflections, a closer match can be made to the polarization return from a vehicle.

The use of the foldable articles hereof as corner reflector decoy devices is important because they provide multiple so-called corner-reflecting prisms. These corner reflectors, irrespective of the angle of incidence of incident wave radiation, are capable of reflecting such radiation in a direction which is parallel with the direction from which it arrived. Thus as stated above, corner reflectors reflect the source-emitted radiation waves back to their source regardless of the orientation of the corner reflector article relative to the source. These decoy purpose corner reflectors will reflect much more energy back to the source than would a similar sized normal object, thereby tending to make the enemy believe there is a large size object in the scanned area, i.e., a truck or tank.

Reference is again made to the fragmentary detail FIG. 17. In addition to utilizing merely the string or cord 20 to limit the desired degree of opening of the panels to their 90° apart relative positions, flexible sheet material quarter panel members 38 may be utilized. These quadrant-spanning panels may be substituted for or intermixed with the strings 20 or the more rigid or semi-rigid type panels described heretofore. The two sides of the panel 28 are suitably attached along lines 40a and 40b to the adjacent rectangular panel members. It is understood that the flexible plastic or fabric sheets will have a metallized coating to provide the requisite reflective characteristic. The various rigid or semi-rigid panels also may be made of thin sheet aluminum or steel. A painted thin steel panel material is deemed quite acceptable for use in reflecting microwaves, whereas highly polished mirror-like finishes are desired for panels intended to reflect light waves.

FIGS. 12-16 are representive of still further embodiments having different geometric shapes, and will only be briefly described. FIG. 12 shows in dotted lines the general starting shape 41 of the basic irregular rectangular polyhedron article which is the general shape shown in FIGS. 1 and 8, prior to undergoing the trimming for final shaping of assembly 42 shown in solid lines, to achieve an octahedron shape. The same octahedron configured reflector 42 is shown in FIG. 13 in a more likely repose as may be found in field usage. FIGS. 14 and 15 are representative of still other irregular polyhedron configured reflector articles 43 and 44 respectively using various combinations of rectangular, triangular and partial or full circular panel members.

FIG. 16 shows a randomly deployed plurality of corner reflector articles 46, 48 and 50, each having an overall envelope configuration of a sphere, the various articles reposing in differently related orientations. Relative to the left-hand article 46, the dotted line rectangular corner portions 46a may be representative of the initial shape of the panel means prior to the arcuate trimming thereof to achieve the overall arcuate periphery shown in the solid lines. Alternatively, if desired, one of the composite panel means may be left in the overall squared or rectangular form as designated by the collective reference numerals 46a, and may be purposely shaped to aid in achieving certain potentially predeterminable orientations when randomly deployed.

If the outside dimensions of the articles 46-50 are rounded as shown to embody a spherical envelope or shape, then it is believed that desired complete coverage can be achieved by the random dispersal of perhaps four or five such reflector articles, inasmuch as they are more free to land and roll to a stop in a greater variety of positions.

Some exemplary reflector article sizes will be discussed, based upon working with exemplary beam diameters of approximately 40 meters. Some reflector articles may have an overall dimension of approximately 60 cm for each of the three orthogonal panel means, such as shown in FIG. 11. In this case, where the overall shape is generally cubical, this provides a very likely uniform orientation irrespective of how the article lands after a randomly thrown deployment. That is, with uniform dimensions in all planes, then the articles will always have one of their planes parallel to the terrain upon which it lands, and thereby provide a reasonably complete coverage in the azimuth direction, but not necessarily directly overhead. Thus, by using a mixture of differently shaped articles more complete coverages can be achieved. The use thereof along with some octahedrons having general equilateral triangular prisms or sections, will provide the desired overhead coverage, such as depicted in FIG. 13.

For such articles which may have the same 60 cm width for each of its first two basic panel means, but with a much lesser exemplary height of perhaps between 30 and 40 cm, then it is quite apparent that one can be more assured of having the reflector assembly land in a position in which the remaining orthogonal third basic panel means is essentially horizontal, much like shown in FIGS. 1, 8, and 11. But again, this orientation would lack direct overhead coverage or protection, as described relative to these prior arrangements.

By combining the various shapes, only some of which are exemplified, various other orientations of the reflector devices are possible, along with selective elimination of one or more partial or full panel members to achieve still further potentially desired coverage arrangements.

From the foregoing detailed description, it is apparent that the variously described embodiments achieve all of the objectives and provide the variously stated advantages hereof. In the event these reflector articles may be desired for use to reflect radio signal waves, then much larger overall size of the units would be necessary. It is also understood that the foldable articles hereof may be also modified for possible non-foldable non-analogous use as multifaced advertising displays, aesthetically appealing decorations or as playful toy-like articles.

While several different preferred embodiments have been described and shown in various degrees of detail, still other variations and modifications may be suggested or made by those skilled in the art without departing from the spirit and scope of the invention as defined in the appended claims.

What is claimed is:

1. A self expanding multipanel device comprising: four basic panel members having a common longitudinal axis; hinge means attached to the basic panel members along the common axis to join said panel members into a foldable unit about the common axis so as to provide a relatively flat multiple layer package in the folded condition and to form four orthogonally disposed panels in the deployed position; four flexible, quadrant spanning panels each of said quadrant spanning panels being disposed between the surfaces of two adjacent basic panel members and being flexibly attached to the surfaces of the two adjacent basic panels near the midline of said surfaces so that in the deployed position each quadrant spanning member and the associated surface of the two basic panels to which it is attached form two trihedral angles; and biasing means adapted to open the basic panel means from a closed to a deployed position said biasing means comprising a first resilient chord having one end attached to one of said adjacent basic panels and the other end attached to the quadrant panel associated with said basic panel the resilient means being attached to the quadrant panel at a point beyond the midline of said quadrant panel when measured from the basic panel, and a second resilient chord having one end attached to the other adjacent basic panel and being disposed on the opposite side of the quadrant panel from said first resilient chord and being further attached to said quadrant panel at a point beyond the midline from said basic panel so that in the folded condition, the resilient chords will tend to pull the device into the deployed configuration.

2. The device of claim 1, wherein the surfaces of said basic panels and said quadrant spanning panels are metalized with a coating capable of reflecting the target seeking waves generated by a target seeking wave generator.

3. The device of claim 1, wherein said device further includes a removable retention means suitable for maintaining the device in a folded condition.

4. The device of claim 1, wherein said basic panels are of semicircular configuration.

5. The device of claim 1, wherein said basic panels and said quadrant panels are isosceles triangles.

* * * * *